(12) United States Patent
Jo et al.

(10) Patent No.: US 7,638,229 B2
(45) Date of Patent: Dec. 29, 2009

(54) LITHIUM SECONDARY BATTERY OF ELECTROLYTE CONTAINING AMMONIUM COMPOUNDS

(75) Inventors: Soo ik Jo, Seoul (KR); Jisang Yu, Daejeon (KR); Byungchul Choi, Seoul (KR); Changjoo Han, Seoul (KR)

(73) Assignee: LG Chem, Ltd. (KR)

( * ) Notice: Subject to any disclaimer, the term of this patent is extended or adjusted under 35 U.S.C. 154(b) by 491 days.

(21) Appl. No.: 11/352,561

(22) Filed: Feb. 13, 2006

(65) Prior Publication Data
US 2007/0003824 A1 Jan. 4, 2007

(30) Foreign Application Priority Data
Feb. 15, 2005 (KR) .................... 10-2005-0012201

(51) Int. Cl.
*H01M 4/00* (2006.01)

(52) U.S. Cl. ....................................................... 429/66

(58) Field of Classification Search ................. 429/66
See application file for complete search history.

(56) References Cited

U.S. PATENT DOCUMENTS 4,049,887 A * 9/1977 Whittingham .............. 429/112
5,521,027 A   5/1996 Okuno et al. ............... 429/194
5,525,443 A * 6/1996 Okuno et al. ............... 429/332
2004/0013942 A1 * 1/2004 Fukumoto et al. ........ 429/231.8

FOREIGN PATENT DOCUMENTS

| JP | 2000-123867 | 4/2000 |
| JP | 2002-25611 | 1/2002 |
| JP | 2002-270230 | 9/2002 |

* cited by examiner

*Primary Examiner*—Patrick Ryan
*Assistant Examiner*—Karie O'Neill
(74) *Attorney, Agent, or Firm*—Cantor Colburn LLP

(57) ABSTRACT

Disclosed is a lithium secondary battery using a cathode containing a lithium-containing transition metal oxide and an anode containing graphitized carbon, characterized in that an ammonium compound capable of providing ammonium ions is added to a non-aqueous electrolyte. Therefore, the present invention provides a lithium secondary battery having improved high-temperature performance by reducing decreases of residual capacity and recovery capacity resulting from high-temperature storage of the battery, via addition of such an ammonium compound.

8 Claims, No Drawings

LITHIUM SECONDARY BATTERY OF ELECTROLYTE CONTAINING AMMONIUM COMPOUNDS

FIELD OF THE INVENTION

The present invention relates to a lithium secondary battery with an electrolyte containing ammonium compounds. More specifically, the present invention relates to a lithium secondary battery having improved high-temperature performance via increased residual capacity and recovery capacity after high-temperature storage, by addition of an ammonium compound capable of providing ammonium ions to a non-aqueous electrolyte in a lithium secondary battery using a cathode containing a lithium-containing transition metal oxide and an anode containing graphitized carbon.

BACKGROUND OF THE INVENTION

Technological development and increased demand for mobile equipment have lead to a rapid increase in the demand for secondary batteries as an energy source. Among these secondary batteries, a great deal of research and study has been focused on a lithium secondary battery having high energy density and discharge voltage and thus such lithium secondary batteries have been commercialized and entered wide use.

The lithium secondary battery uses a metal oxide such as $LiCoO_2$ as a cathode active material and a carbonaceous material as an anode active material, and is prepared by disposition of a porous polymer separator between the anode and cathode and addition of a non-aqueous electrolyte containing a lithium salt such as $LiPF_6$. Upon charging, lithium ions exit from the cathode active material and migrate to enter into a carbon layer of the anode. In contrast, upon discharging, lithium ions exit from the carbon layer and migrate to enter into the cathode active material. Here, the non-aqueous electrolyte serves as a medium through which lithium ions migrate between the anode and cathode. Such a lithium secondary battery must be basically stable in a range of operating voltage of the battery and must have ability to transfer ions at a sufficiently rapid rate.

When the non-aqueous electrolyte only uses, as a component, a cyclic carbonate having high polarity to sufficiently dissociate lithium ions, this may results in problems associated with increased viscosity of the electrolyte and thus decreased ionic conductivity.

Therefore, U.S. Pat. Nos. 5,521,027 and 5,525,443 disclose a mixed electrolyte of linear carbonates having low polarity but low viscosity to reduce viscosity. Representative examples of linear carbonates may include dimethyl carbonate (DMC), diethyl carbonate (DEC) and ethylmethyl carbonate (EMC). Among them, EMC having the lowest freezing point of −55° C. exerts superior low-temperature performance and life performance when it is used. As examples of cyclic carbonates, mention may be made of ethylene carbonate (EC), propylene carbonate (PC) and butylene carbonate (BC). Inter alia, PC has a low freezing point of −49° C. and thus exerts good low-temperature performance. However, when graphitized carbon having a large volume is used as the anode, PC sharply reacts with the anode during a charging process, and therefore it is difficult to use large amounts of PC. For this reason, EC, which forms a stable protective film at the anode, is primarily used. However, it cannot be said that EC is completely free of reactivity, and therefore decomposition of the electrolyte, which occurs at the anode and cathode during charging/discharging of the battery, is one of numerous causes that shorten a battery life, and particularly EC exhibits increased reactivity at high temperatures, thus resulting in problems.

As an attempt to overcome such problems and thereby improve the battery life at room temperature and high temperature, Japanese Patent Laid-open Publication No. 2000-123867 discloses a battery in which small amounts of ester compounds having a cyclic molecular structure and C=C unsaturated bonds within the ring (for example, vinylene carbonate) were added to the electrolyte. It is believed that such additive compounds decompose at the anode or cathode and then form films on the surfaces of the electrodes, thereby inhibiting decomposition of the electrolyte. However, such additives also cannot completely prevent decomposition of the electrolyte.

In addition, Japanese Patent Laid-open Publication No. 2002-25611 discloses a battery in which ethylene sulfite and vinylene carbonate were added to the electrolyte, and Japanese Patent Laid-open Publication No. 2002-270230 discloses a battery in which various kinds of ethylene sulfite compounds were added to the electrolyte. However, it was also confirmed that those additives disclosed in the above-mentioned prior arts did not exert a desired degree of effects. Further, as battery performance at high temperatures has become gradually important, there is an urgent need for the development of more effective additives.

Therefore, the present invention has been made to solve the above problems and other technical problems that have yet to be resolved.

As a result of a variety of extensive and intensive studies and experiments to solve the problems as described above, the inventors of the present invention have discovered, as will be described hereinafter, the facts that, in a lithium secondary battery comprised of a cathode containing a lithium-containing transition metal oxide, an anode containing graphitized carbon, a porous separator and an electrolyte containing a lithium salt, addition of an ammonium compound capable of providing ammonium ions to the electrolyte results in increased residual capacity and recovery capacity after high-temperature storage of the battery and thereby it is possible to prepare a lithium secondary battery having improved high-temperature performance. The present invention has been completed based on these findings.

SUMMARY OF THE INVENTION

In accordance with an aspect of the present invention, the above and other objects can be accomplished by the provision of a lithium secondary battery, comprising:

a cathode active material including a lithium-containing transition metal oxide capable of performing reversible storage and release of lithium ions;

an anode active material including graphitized carbon capable of performing reversible storage and release of lithium ions;

a porous separator; and a non-aqueous electrolyte containing (i) a lithium salt, (ii) an electrolyte solution and (iii) an ammonium compound.

The ammonium compound can liberate ammonium ions that can remove metal ions present in the electrolyte, such as manganese (Mn) ions, and forms a stable surface coating on the anode to thereby inhibit deposition of metal ions. Therefore, it is possible to inhibit additional electrolyte decomposition reaction resulting from deposition of metal ions. In such a manner, addition of the ammonium compound to the electrolyte can reduce degradation of high-temperature cycle characteristics of the lithium secondary battery and decreases in residual capacity and recovery capacity resulting from high-temperature storage of the battery.

Preferred examples of the ammonium compounds added to the electrolyte may include ammonium compounds containing a carboxyl group, represented by Formula (I):

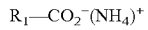

wherein $R_1$ is optionally substituted alkyl or optionally substituted aryl; and halogenated ammonium compounds represented by Formula (II):

wherein A is a halogen atom such as fluorine, chlorine, iodine or the like.

Each compound of Formulae (I) and (II) may be independently used alone or in any combination. If necessary, two compounds of Formulae (I) and (II) may be used together.

As used herein, the term "optionally substituted" is intended to encompass the case in which the corresponding substituent(s) is/are substituted by one or more groups individually and independently selected from alkyl, cycloalkyl, alkenyl, cycloalkenyl, aryl, heteroaryl, heteroalicyclic, hydroxy, alkoxy, aryloxy, mercapto, alkylthio, arylthio, oxo, cyano, halogen, carbonyl, thiocarbonyl, O-carbamyl, N-carbamyl, O-thiocarbamyl, N-thiocarbamyl, C-amido, N-amido, S-sulfonamido, N-sulfonamido, optionally substituted sulfonyl, C-carboxy, O-carboxy, isocyanato, thiocyanato, isothiocyanato, nitro, silyl, trihalomethanesulfonyl, pyrrolidinyl, piperidinyl, piperazinyl, pyridinyl, morpholinyl, furyl, thiazolidine, isoxazole, azetidinyl, dioxolane, pyrazinyl, thienyl, aziridine, oxazolidine, imidazole, alkanoic acid, alkanoate, amino including mono- and di-substituted amino and protected derivatives thereof. Where appropriate, these substituents may also be optionally substituted.

As used herein, the term "alkyl" refers to an aliphatic hydrocarbon group. An alkyl moiety may be a "saturated alkyl" group, thus representing that no alkene or alkyne portion is contained. Alternatively, the alkyl moiety may be an "unsaturated alkyl" group, thus being capable of containing at least one alkene or alkyne portion. The term "alkene" moiety refers to a group in which at least two carbon atoms form at least one carbon-carbon double bond. The term "alkyne" moiety refers to a group in which at least two carbon atoms form at least one carbon-carbon triple bond. The alkyl moiety, regardless of whether it is saturated or unsaturated, may be branched, linear or cyclic.

Alkyl may contain 1 to 20 carbon atoms. Alkyl may also have a medium chain length containing 1 to 10 carbon atoms. In addition, alkyl may be lower alkyl containing 1 to 6 carbon atoms. For example, $C_1$-$C_4$ alkyl may be selected from hydrocarbyl groups containing 1 to 4 carbon atoms in the alkyl chain, i.e., the group consisting of methyl, ethyl, propyl, iso-propyl, n-butyl, iso-butyl, sec-butyl and t-butyl.

Typical alkyl denotes a hydrocarbon group which may be substituted by one or more groups individually and independently selected from methyl, ethyl, propyl, iso-propyl, n-butyl, iso-butyl, t-butyl, pentyl, hexyl, ethenyl, propenyl, butenyl, cyclopropyl, cyclobutyl, cyclopentyl and cyclohexyl.

As used herein, the term "aryl" refers to an aromatic group which has at least one ring having a conjugated pi (π) electron system and includes carbocyclic aryl (for example, phenyl) and heterocyclic aryl (for example, pyridine) groups. This term includes monocyclic or fused-ring polycyclic (i.e., rings which share adjacent pairs of carbon atoms) groups.

As used herein, the term "heteroaryl" refers to aryl including at least one heterocyclic ring.

As used herein, the term "heterocycle" refers to a carbocyclic group in which ring carbon atoms are substituted with oxygen, nitrogen or sulfur. Examples of heterocycle includes, but are not limited to, furan, thiophene, pyrrole, pyrroline, pyrrolidine, oxazole, thiazole, imidazole, imidazoline, imidazolidine, pyrazole, pyrazoline, pyrazolidine, isothiazole, triazole, thiadiazole, pyran, pyridine, piperidine, morpholine, thiomorpholine, pyridazine, pyrimidine, pyrazine, piperazine and triazine.

As the term used throughout the specification of the present invention, the substituent "R" refers to, when it is described without specific designation of a suffix number, a substituent selected from the group consisting of alkyl, cycloalkyl, aryl, heteroaryl (bound via ring carbon atoms) and heteroalicyclic (bound via ring carbon atoms).

An "O-carboxy" group refers to a —RC(=O)O— group, with R as defined herein.

A "C-carboxy" group refers to a —C(=O)OR group, with R as defined herein.

An "acetyl" group refers to a —C(=O)CH$_3$ group.

A "trihalomethane sulfonyl" group refers to a Y$_3$CS(=O)$_2$— group, wherein Y is halogen.

A "cyano" group refers to a —CN group.

An "isocyanato" group refers to a —NCO group.

A "thiocyanato" group refers to a —CNS group.

An "isothiocyanato" group refers to a —NCS group.

A "sulfinyl" group refers to a —S(=O)—R group, with R as defined herein.

An "S-sulfonamido" group refers to a —S(=O)$_2$NR group, with R as defined herein.

An "N-sulfonamido" group refers to a RS(=O)$_2$NH— group, with R as defined herein.

A "trihalomethanesulfonamido" group refers to a Y$_3$CS(=O)$_2$NR— group, with Y and R as defined herein.

An "O-carbamyl" group refers to a —OC(=O)—NR group, with R as defined herein.

An "N-carbamyl" group refers to a ROC(=O)NH— group, with R as defined herein.

An "O-thiocarbamyl" group refers to a —OC(=S)—NR group, with R as defined herein.

An "N-thiocarbamyl" group refers to a ROC(=S)NH— group, with R as defined herein.

A "C-amido" group refers to a —C(=O)—NR$_2$ group, with R as defined herein.

An "N-amido" group refers to a RC(=O)NH— group, with R as defined herein.

The term "perhaloalkyl" refers to an alkyl group in which all of hydrogen atoms are replaced with halogen atoms.

Other terms as used herein may be interpreted as the meaning as commonly understood in the art to which the present invention pertains.

Preferably, $R_1$ is lower alkyl containing 1 to 6 carbon atoms or phenyl.

As the ammonium compound of Formula (I), particularly preferred are ammonium acetate and ammonium benzoate.

Particularly preferred examples of halogenated ammonium compounds of Formula (II) may include ammonium chloride and ammonium iodide.

The content of the ammonium compound is preferably in a range of 0.01 to 10% by weight, based on the total weight of the electrolyte. When the content of the ammonium compound additive is too low, it is difficult to achieve desired addition effects. Conversely, when the content of the additive is too high, this undesirably leads to increased viscosity of the electrolyte and increased resistance of the thus prepared battery, thereby deteriorating performance of the battery.

DETAILED DESCRIPTION OF PREFERRED EMBODIMENTS

Hereinafter, the present invention will be described in more detail.

As discussed above, a lithium secondary battery in accordance with the present invention is comprised of a cathode active material containing a lithium-containing transition metal oxide; an anode active material including graphitized carbon; a porous separator; and an electrolyte containing a lithium salt, an electrolyte solution and an ammonium compound.

Examples of the lithium-containing transition metal oxide in the cathode active material that can be used in the present invention include one or more metal oxides selected from the group consisting of compounds represented by Formula (III):

$$LiCo_aMn_bNi_cM_dO_2$$

wherein each a, b, c and d is independently in a range of 0 to 1, with proviso that the sum of a, b, c and d is 1, and M is selected from the group consisting of Al, B, Ga, Mg, Si, Ca, Ti, Zn, Ge, Y, Zr, Sn, Sr, Ba and Nb; and compounds represented by Formula (IV):

$$Li_xMn_{2-y}M'_yO_4$$

wherein

X is in a range of 0.9 to 2,

Each Y is independently in a range of 0 to 0.5, and

M' is selected from the group consisting of Fe, Co, Ni, Cu, Zn, Al, Sn, Cr, V, Ti, Mg, Ca, Sr, B, Ga, In, Si and Ge.

As preferred examples of the compounds of Formulae (III) and (IV), mention may be made of $LiCoO_2$, $LiNiO_2$, $LiMn_2O_4$ and $LiNi_{1-x}Co_xO_2$.

The cathode is, for example, fabricated by applying a mixture of the cathode active material in accordance with the present invention, a conductive agent and a binding agent to a cathode current collector, followed by drying. If desired, a filling agent may be added to the above mixture.

The cathode current collector is generally fabricated to have a thickness of about 3 to 500 μm. There is no particular limit to the cathode current collector, so long as it has high conductivity without causing chemical changes in the battery. As examples of the cathode current collector, mention may be made of stainless steel, aluminum, nickel, titanium, sintered carbon, and aluminum or stainless steel which was surface-treated with carbon, nickel, titanium or silver. The current collector may be fabricated to have micro irregularities on the surface thereof so as to enhance adhesiveness to the cathode active material. In addition, the current collector may take various forms including films, sheets, foils, nets, porous structures, foams and non-woven fabrics.

The conductive agent utilized in the present invention is typically added in an amount of 1 to 50% by weight, based on the total weight of the mixture including the cathode active material. There is no particular limit to the conductive agent, so long as it has suitable conductivity without causing chemical changes in the battery. As examples of conductive agents, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metal fibers; carbon fluoride; metal powder such as aluminum or nickel powder; conductive whiskers such as zinc oxide and potassium titanate; conductive metal oxides such as titanium oxide; and polyphenylene derivatives.

The binding agent is an ingredient assisting in bonding between the active material and conductive agent, and in binding to current collectors. The binding agent utilized in the present invention is typically added in an amount of 1 to 50% by weight, based on the total weight of the mixture including the cathode active material. As examples of the binding agent, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filling agent is an optional ingredient that inhibits cathode expansion. There is no particular limit to the filling agent, so long as it does not cause chemical changes in the battery and is a fibrous material. As examples of the filling agent, there may be used olefin polymers such as polyethylene and polypropylene; and fibrous materials such as glass fiber and carbon fiber.

As the graphitized carbon in the anode active material, it is preferred to use graphitized carbon in which a carbonaceous material used as the anode active material has a crystal face distance constant, i.e., $d_{002}$ value of less than 0.338 nm, as measured by X-ray diffraction, and has a specific surface area of less than 10 m$^2$/g, as measured by a BET method.

The anode is fabricated by applying an anode active material to an anode current collector, followed by drying. If necessary, other components, as described above, may be further added.

The anode current collector is generally fabricated to have a thickness of 3 to 500 μm. There is no particular limit to the anode current collector, so long as it has suitable conductivity without causing chemical changes in the battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form micro irregularities on the surface thereof so as to enhance adhesiveness to the anode active material. In addition, the anode current collector may take various forms including films, sheets, foils, nets, porous structures, foams and non-woven fabrics.

The separator is disposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

As the non-aqueous electrolyte, a non-aqueous electrolyte solution, organic solid electrolyte and inorganic solid electrolyte may be utilized.

As the non-aqueous electrolyte solution, for example, mention may be made of non-protic organic solvents such as N-methyl-2-pyrollidinone, cyclic and/or linear carbonate compounds including for example, propylene carbonate (PC), ethylene carbonate (EC), butylene carbonate (BC), dimethyl carbonate (DMC) and diethyl carbonate (DEC), gamma-butyro lactone (GBL), 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate (MA), phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate (MP) and ethyl propionate (EP). Among these solvent compounds, particularly preferred are ethylene carbonate (EC), propylene carbonate (PC), butylene carbonate (BC), vinylene carbonate (VC), diethyl carbonate (DEC), dimethyl carbonate (DMC), ethylmethyl carbonate (EMC), gamma-butyro lactone (GBL), sulfolane, methyl acetate (MA), ethyl acetate (EA), methyl propionate (MP) and ethyl propionate (EP).

As examples of the organic solid electrolyte utilized in the present invention, mention may be made of polyethylene derivatives, polyethylene oxide derivatives, polypropylene oxide derivatives, phosphoric acid ester polymer, poly agitation lysine, polyester sulfide, polyvinyl alcohol, poly(vinylidene fluoride), and polymers containing ionic dissociation groups.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide. Among these materials, particularly preferred are $LiClO_4$, $LiCF_3SO_3$, $LiC_4F_9SO_3$, $LiPF_6$, $LiBF_4$, $LiAsF_6$, $LiN(C_2F_5SO_2)_2$ and $LiN(CF_3SO_2)_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride.

EXAMPLES

Now, the present invention will be described in more detail with reference to the following examples. These examples are provided only for illustrating the present invention and should not be construed as limiting the scope and spirit of the present invention.

Example 1

0.5% by weight of ammonium benzoate was added to 1M $LiPF_6$ dissolved in ethylene carbonate/ethyl methyl carbonate (hereinafter, referred to as 1M $LiPF_6$ EC/EMC electrolyte) and the mixture was then stirred to prepare an electrolyte.

Example 2

1% by weight of ammonium benzoate was added to 1M $LiPF_6$ EC/EMC electrolyte and the mixture was then stirred to prepare an electrolyte.

Example 3

2% by weight of ammonium benzoate was added to 1M $LiPF_6$ EC/EMC electrolyte and the mixture was then stirred to prepare an electrolyte.

Example 4

5% by weight of ammonium benzoate was added to 1M $LiPF_6$ EC/EMC electrolyte and the mixture was then stirred to prepare an electrolyte.

Example 5

1% by weight of ammonium acetate was added to 1M $LiPF_6$ EC/EMC electrolyte and the mixture was then stirred to prepare an electrolyte.

Example 6

1% by weight of ammonium chloride was added to 1M $LiPF_6$ EC/EMC electrolyte and the mixture was then stirred to prepare an electrolyte.

Example 7

1% by weight of ammonium iodide was added to 1M $LiPF_6$ EC/EMC electrolyte and the mixture was then stirred to prepare an electrolyte.

Comparative Example 1

1M $LiPF_6$ EC/EMC electrolyte was prepared without addition of an organic compound.

Experimental Example

Using spinel manganese as a positive electrode, a carbon electrode as the negative electrode, and respective electrolytes prepared in Examples 1 through 7 and Comparative Example 1, the corresponding coin cells (full-cells) were prepared. After storage at a temperature of 65° C. for 3 days, the-thus prepared cells were respectively measured for residual capacity and recovery capacity. The results thus obtained are given in Table 1 below.

TABLE 1

| | Initial capacity (mAh) | Residual capacity (mAh) | Eff. (%) | Recovery capacity (mAh) | Eff. (%) |
| --- | --- | --- | --- | --- | --- |
| Example 1 | 0.945 | 0.661 | 70 | 0.746 | 79 |
| Example 2 | 0.950 | 0.684 | 72 | 0.740 | 78 |
| Example 3 | 0.962 | 0.683 | 71 | 0.750 | 78 |
| Example 4 | 0.965 | 0.685 | 71 | 0.752 | 78 |
| Example 5 | 0.972 | 0.690 | 71 | 0.758 | 78 |
| Example 6 | 0.951 | 0.685 | 72 | 0.750 | 79 |
| Example 7 | 0.952 | 0.683 | 72 | 0.745 | 78 |
| Comp. Example 1 | 0.937 | 0.627 | 67 | 0.709 | 76 |

As can be seen from Table 1, lithium secondary batteries to which organic ammonium compounds were added to electrolytes (Examples 1 through 5) and lithium secondary batteries to which halogenated ammonium compounds were added to electrolytes (Examples 6 and 7), according to the present invention, exhibited increases in residual capacity and recovery capacity of the battery after high-temperature storage, as compared to a lithium secondary battery to which no additive was added (Comparative Example 1). In particular, when the content of ammonium compound was in a range of 0.1 to 8% by weight, based on the total weight of the electrolyte, superior addition effects of the ammonium compound were obtained.

INDUSTRIAL APPLICABILITY

As apparent from the above description, a lithium secondary battery in accordance with the present invention exerts capacity-increasing effects of the battery, and high-temperature performance-improving effects via reduction of decreases in residual capacity and recovery capacity resulting from high-temperature storage of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery, comprising:
    a cathode active material including a lithium-containing transition metal oxide capable of performing reversible storage and release of lithium ions;
        an anode active material including graphitized carbon capable of performing reversible storage and release of lithium ions;
        a porous separator; and
        a non-aqueous electrolyte containing (i) a lithium salt, (ii) an electrolyte solution and (iii) a metal ion deposition inhibitor wherein the metal ion deposition inhibitor comprises an ammonium compound, wherein the ammonium compound forms a stable surface coating on the anode to prevent the deposition of metal ions and
    wherein the lithium-containing transition metal oxide in the cathode active material is one or more metal oxides selected from the group consisting of compounds represented by Formula (III):

$$LiCo_aMn_bNi_cM_dO_2 \tag{III}$$

wherein
    each a, b, c and d is independently in a range of 0 to 1, with proviso that the sum of a, b, c and d is 1, and M is selected from the group consisting of Al, B, Ga, Mg, Si, Ca, Ti, Zn, Ge, Y, Zr, Sn, Sr, Ba and Nb; and
    compounds represented by Formula (IV):

$$Li_xMn_{2-y}M'_yO_4 \tag{IV}$$

wherein
    X is in a range of 0.9 to 2,
    Each Y is independently in a range of 0 to 0.5, and
    M' is selected from the group consisting of Fe, Co, Ni, Cu, Zn, Al, Sn, Cr, V, Ti, Mg, Ca, Sr, B, Ga, In, Si and Ge.

2. The battery according to claim 1, wherein the ammonium compound is one or more halogenated ammonium compounds selected from compounds represented by Formula (II):

$$A^-(NH_4)^+$$

wherein A is a halogen atom.

3. The battery according to claim 1, wherein the halogenated ammonium compound is ammonium chloride or ammonium iodide.

4. The battery according to claim 1, wherein the content of the ammonium compound is in the range of 0.01 to 10% by weight, based on the total weight of the electrolyte.

5. The battery according to claim 1, wherein the lithium-containing transition metal oxide is selected from the group consisting of $LiCoO_2$, $LiNiO_2$, $LiMn_2O_4$ and $LiNi_{1-x}Co_xO_2$.

6. The battery according to claim 1, wherein the graphitized carbon has a distance constant between crystal faces of a carbonaceous material, $d_{002}$ value of less than 0.338 nm, as measured by X-ray diffraction, and a specific surface area of less than 10 m$^2$/g, as measured by a BET method.

7. The battery according to claim 1, wherein the lithium salt is selected from the group consisting of $LiClO_4$, $LiCF_3SO_3$, $LiC_4F_9SO_3$, $LiPF_6$, $LiBF_4$, $LiAsF_6$, $LiN(C_2F_5SO_2)_2$ and $LiN(CF_3SO_2)_2$.

8. The battery according to claim 1, wherein the electrolyte solution is at least one selected from the group consisting of ethylene carbonate (EC), propylene carbonate (PC), butylene carbonate (BC), vinylene carbonate (VC), diethyl carbonate (DEC), dimethyl carbonate (DMC), ethylmethyl carbonate (EMC), gamma-butyro lactone (GBL), sulfolane, methyl acetate (MA), ethyl acetate (EA), methyl propionate (MP) and ethyl propionate (EP).

* * * * *

UNITED STATES PATENT AND TRADEMARK OFFICE
CERTIFICATE OF CORRECTION

PATENT NO.        : 7,638,229 B2                                    Page 1 of 1
APPLICATION NO.   : 11/352561
DATED             : December 29, 2009
INVENTOR(S)       : Jo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 810 days.

Signed and Sealed this

Ninth Day of November, 2010

David J. Kappos
*Director of the United States Patent and Trademark Office*